United States Patent Office 3,361,523
Patented Jan. 2, 1968

3,361,523
METHOD FOR PRODUCING PHOSPHATES
Chung Yu Shen, St. Louis, Mo., assignor to Monsanto Company, a corporation of Delaware
No Drawing. Filed Mar. 19, 1963, Ser. No. 266,170
15 Claims. (Cl. 23—106)

This invention pertains to a method for preparing compounds of phosphorus and, more particularly, to a method for preparing various crystalline condensed phosphates, such as, alkali metal tripolyphosphates, alkali metal pyrophosphates, alkaline earth metal pyrophosphates, alkali metal trimetaphosphates, alkaline earth metal metaphosphates, and the like.

Heretofore, processes of preparing the various crystalline condensed phosphates have, in general, been non-related in so far as the reactants used, conditions for the processes, and the like. For example, in preparing tetrasodium pyrophosphates, anhydrous disodium orthophosphate is calcined at any temperature between about 300° and 900° C. in a relatively easy and straight forward manner. However, in preparing pentasodium tripolyphosphate a mixture of one mole of monosodium orthophosphate and two moles of disodium orthophosphate is calcined at any temperature between about 250° C. and 600° C. In order to achieve acceptable yields the mixture must be intimately mixed and various methods have been utilized to effect this intimate contact, such as, cocrystallization, flash drying of the appropriate solution, ball-milling or comminution of a mixture of the solids, and even melting of the composition followed by rapid chilling and subsequent tempering. As can be appreciated, therefore, a process for preparing the various crystalline condensed phosphates, utilizing the same starting materials and substantially the same conditions would represent an extremely versatile yet selective method for producing any one of the desired condensed phosphates and would, therefore, represent a significant advancement in this art.

It is, therefore, an object of this invention to provide an improved method for producing crystalline condensed phosphates.

It is another object of this invention to provide an improved versatile yet selective method for preparing various crystalline condensed phosphates.

It is a further object of this invention to provide an improved method for producing an alkali metal or alkaline earth metal crystalline condensed phosphate substantially free of impurities by a solid phase conversion of an intermediate condensed phosphate material.

It is a still further object of this invention to provide a method for producing an alkali metal or alkaline earth metal crystalline condensed phosphate substantially free of impurities by effecting a solid phase conversion of an amorphous intermediate condensed phosphate material produced from a reaction utilizing as one of the initial reactants condensed phosphoric acid.

These and other objects will become apparent from a reading of the detailed description given herebelow and the claims appended hereto.

It has now been found that the crystalline alkali metal condensed phosphates, such as, alkali metal tripolyphosphate, alkali metal pyrophosphate and alkali metal trimeta phosphate, and the alkaline earth metal condensed phosphates, such as, alkaline earth metal pyrophosphate and alkaline earth metal metaphosphate, can be prepared by reacting a condensed phosphoric acid source with an amount of an alkali metal or alkaline earth metal source sufficient to form the desired product and thereafter heating the amorphous intermediate condensed phosphate material formed by the reaction below the liquification temperature of the desired product for a time sufficient to effect the solid phase conversion, i.e., a conversion which does not pass through a molten stage, of the intermediate material to the desired product as will be more fully discussed hereinafter. As used herein liquification temperatures means the melting point for products which are compounds and for products which are mixtures of compounds means the temperature at which the product loses its particulate nature. As can be appreciated, the foregoing process is extremely versatile in that any one of a number of condensed phosphates may be produced by, in general, merely adjusting the proportions of the condensed phosphoric acid source to alkali metal or alkaline earth metal source used in the reaction, and yet is extremely selective in that the desired condensed phosphate product can be produced, if desired, substantially free of impurities. This is, of course, truly surprising and totally unexpected since the acid source utilized may be a mixture of various phosphoric acids and can contain a relatively high percentage of relatively long chain polyphosphoric acid polymers.

It should be noted that as used herein the term "substantially free of impurities" when used in relation to the desired condensed phosphate product means a crystalline condensed phosphate containing not over about 10% by weight of phosphate materials other than the desired crystalline condensed phosphate.

Since the process is not completely understood, the following theoretical explanation of the process is presented with the intention that it is in no way a limitation of the process of the instant invention. It should be noted that, heretofore, in forming crystalline condensed phosphates by the so called "solid phase" or "molecular dehydration" process, particularly when using salts of orthophosphoric acid, the process is believed to be a conversion of the crystalline ortho-salts to the crystalline condensed phosphates. However, the process of the instant invention proceeds from a condensed phosphoric acid starting material to an amorphous intermediate condensed phosphate material without thermal liquification which intermediate is then converted by a so-called "solid phase" conversion to the crystalline condensed phosphates. The formation of the amorphous intermediate condensed phosphate material and the ability to convert this material in a relatively easy and straight forward manner to crystalline condensed phosphate material, in any event, is believed to be truly surprising and totally unexpected.

Condensed phosphoric acid is a phosphoric acid containing any quantity of one or more polyphosphoric acids and/or metaphosphoric acids and any such acid can be employed in this invention. The polyphosphoric acids include pyrophosphoric acid and other polymers from the tri to the nonapolymer and higher. The properties and compositions of the polyphosphoric acids vary with the $P_2O_5$ content of the condensed phosphoric acid as discussed in Van Wazer, Phosphorus and Its Compounds, Interscience Publishers, Inc., New York, N.Y., vol. 1 (1958) and shown by table 12–1, page 748. Although, in general, for the instant invention any condensed phosphoric acid is suitable as the acid source, the preferred condensed phosphoric acids are liquid mixtures ranging from about 72 percent $P_2O_5$ by weight which contains about 89.4 percent orthophosphoric acid and 10.6 percent pyrophosphoric acid to about 85 percent $P_2O_5$ by weight which contains about 1.3 percent orthophosphoric acid, 1.8 percent pyrophosphoric acid, 2.4 percent tripolyphosphoric acid, and about 94 percent of polyphosphoric acid polymers higher than tripolyphosphoric acid.

Condensed phosphoric acid may be prepared by dissolving quantities of $P_2O_5$ in orthophosphoric acid, by evaporating water from orthophosphoric acid, or by operating equipment ordinarily used for the manufacture of orthophosphoric acid from phosphorus by reacting less water with the $P_2O_5$ produced than is normally required for the manufacture of orthophosphoric acid.

Condensed phosphoric acid sources, in addition, include, in general, materials which are capable of forming condensed phosphoric acid in situ such as, tetraethyl pyrophosphate which can produce under certain conditions pyrophosphoric acid with evolution of ethylene, as well as materials which contain condensed phosphoric acids, such as commercial reagent grade so-called "metaphosphoric acid" which contains some $Na_2O$ in addition to the normal $H_2O$ and $P_2O_5$ present in the acid.

In general, any alkali metal or alkaline earth metal source is suitable as long as it is capable of reacting with the condensed phosphoric acid to form an amorphous intermediate condensed phosphate material containing the desired alkali metal or alkaline earth metal. It is preferred that the alkali metal or alkaline earth metal source used be such as to provide only the metal oxide and phosphorous pentoxide in the desired proportion in the final crystalline product. In particular, such alkali metal or alkaline earth metal sources which contain moieties capable of producing or forming gases during the reaction or being volatilized away during the calcining step are preferred. Such alkali metal sources include the salts, oxides and hydroxides, such as, $Na_2CO_3$, $NaCl$, $NaOH$, $Na_2O$, $K_2CO_3$, $KCl$, $KNO_3$, $KOH$, $K_2O$, $Li_2CO_3$, $LiCl$, $LiNO_3$, and the like including mixtures thereof. Such alkaline earth metal sources include the salts, oxides, and hydroxides, such as, $CaCO_3$, $CaCl_2$, $Ca(OH)_2$, $CaO$, $Ca(NO_3)_2$, $MgO$, $MgCO_3$, $MgCl_2$, $Mg(NO_3)_2$, and the like including mixtures thereof. Although alkali metal sources of cesium, rubidium, and francium and alkaline earth metal sources of strontium and barium, can, in some cases, be used in practicing this invention, since they are relatively expensive and are not readily available they are not believed to offer the advantages for use as the foregoing alkali metal or alkaline earth metal sources. In addition, other alkali metal or alkaline earth metal sources which can be used include those materials which contain organic radicals such as oxalates, citrates and the like, including mixtures thereof such as, sodium oxalate, sodium citrate, and the like. Because the sodium, potassium and calcium condensed phosphates are, in general, the most widely used phosphates and because such alkali metal sources as $Na_2CO_3$, $NaOH$, $K_2CO_3$, $KOH$, and such alkaline earth metal sources as $CaO$, $Ca(OH)_2$, and $CaCO_3$ are relatively inexpensive as well as being readily available, they are the preferred alkali metal and alkaline earth metal sources for use in practicing the invention.

As can be observed from the foregoing, the process is very general and can be utilized to produce any of the desired stable alkali metal and alkaline earth metal crystalline condensed phosphates. Stable alkali metal crystalline condensed phosphates include the penta-salt of the tripolyphosphate, the tetra-salt of the pyrophosphate and the tri-salt of the trimetaphosphate. Stable alkaline earth metal crystalline condensed phosphates include the di-salt of the pyrophosphate and the mono-salt of the metaphosphate. In order to produce a desired alkali metal or alkaline earth metal crystalline condensed phosphate having a minimum of other phosphate impurities therein, the proportion of the alkali metal or alkaline earth metal material and condensed phosphoric acid should be adjusted so that the alkali metal or alkaline earth metal and phosphorus proportions present in the reaction product have about the mole ratio of the proportions present in the desired alkali metal or alkaline earth metal crystalline condensed phosphate. For example, when preparing pentasodium tripolyphosphate ($Na_5P_3O_{10}$) the mole ratio of the alkaline metal material and the condensed phosphoric acid should be adjusted to give a Na/P ratio of about 5:3, while the mole ratio for tetrasodium pyrophosphate ($Na_4P_2O_7$) should be adjusted to give a Na/P ratio of about 2:1, and the mole ratio for trisodium trimetaphosphate ($Na_3P_3O_9$) should be adjusted to give a Na/P ratio of about 1:1. As another example, when preparing the dicalcium pyrophosphate ($Ca_2P_2O_7$) the mole ratio of the alkaline earth metal material and the condensed phosphoric acid should be adjusted to give a Ca/P ratio of about 1:1, while the mole ratio for calcium metaphosphate ($CaP_2O_6$) should be adjusted to give a Ca/P ratio about 1:2.

It should be noted that it may be advantageous at times to prepare a mixed alkali metal or mixed alkaline earth metal condensed phosphate. This may be done, in general, by using a mixture of an alkali metal material or a mixture of an alkaline earth metal material which contains the desired proportions of the various alkali metals or various alkaline earth metals. The foregoing with respect to the preparation of the alkali metal and alkaline earth metal condensed phosphates is, in general, also applicable to the preparation of the mixed alkali metal or mixed alkaline earth metal condensed phosphates. For example, when preparing a sodium-potassium tripolyphosphate a mixture of sodium and potassium material is used in such amounts as to result in the intermediate phosphate material containing the desired molar ratio of Na+K/P of about 1.67.

It should further be noted that it may be advantageous at times to prepare a mixture of the crystalline condensed phosphates. This may be done, in general, by using molar ratios of the alkali metal or alkaline earth metal to condensed phosphoric acid other than the foregoing ratios used to produce a particular condensed phosphate. In many cases, an alkali condensed phosphate mixture containing predominantly, i.e., above about 50% by weight, tripolyphosphate and trimetaphosphate can be prepared by adjusting the proportions of the alkali metal material to the condensed phosphoric acid such that the alkali metal to phosphorus proportions present in the intermediate reaction material have molar ratios between the molar ratios of 1 and 1.67. In many cases, an alkali metal condensed phosphate mixture containing predominantly tripolyphosphate and pyrophosphate can be prepared by adjusting the proportion of the alkali metal material to the condensed phosphoric acid such that the alkali metal to phosphorus proportions present in the intermediate reaction material have molar ratios between the molar ratios of 1.67 and 2. In like manner, by using proportions of the reactants such that the alkali metal to phosphorus proportions present in the intermediate reaction material have a molar ratio over about 2, i.e., between about 2 to 3, it is possible to prepare a crystalline condensed phosphate mixture containing predominantly pyrophosphate and orthophosphate. The foregoing is, in general, also applicable to preparing alkaline earth metal condensed phosphate mixtures, however, it should be noted that when using proportions of alkaline earth metal materials and condensed phosphoric acid such that the alkaline earth metal to phosphorus proportions present in the intermediate reaction material have a molar ratio between 0.5 and 1. The resulting crystalline alkaline earth metal condensed phosphate mixture contains predominantly metaphosphate and pyrophosphate since tripolyphosphate is not present in the alkaline earth metal condensed phosphate system.

In general, the alkali metal or alkaline earth metal material and the condensed phosphoric acid need only be reacted together to produce the amorphous intermediate condensed phosphate material. Usually, condensed phosphoric acids at room temperature and having a composition of about 72 to 82% $P_2O_5$ by weight are liquids which exhibit an oily appearance, from about 82 to 89% $P_2O_5$ by weight they progress through a tar and taffy-like stage, and above about 90% $P_2O_5$ by weight they are brittle glasses. For use in practicing this invention the condensed phosphoric acids may be in the liquid state, in the super cooled viscous state, or in the solid form. It is preferred to use the condensed phosphoric acid in a relatively fluid liquid state for ease of handling and control of the reaction. In some cases, in order to improve the fluidity of the liquid state it may be necessary to heat the condensed phosphoric acid. In general, any temperatures may be used which improve the viscosity of the condensed phosphoric acid but usually not over about 400° C., with lower temperatures, i.e., not over about 100° C., being sufficient in most cases to achieve sufficient fluidity. In addition, water also may be added to improve the fluidity of the liquid state, however, when water is used it is preferred to keep the temperature of the condensed phosphoric acid below about 60° C. in order to reduce the possibility of hydrolysis of the condensed phosphoric acid which may result in excessive degradation of the condensed phosphate anions. The alkali metal or alkaline earth metal source can be in the liquid state, such as being dissolved or suspended in an aqueous solution, or in the solid form, such as granular or powdered material. In most cases, the reactants need only to be admixed, preferably one reactant in the liquid form and the other reactant in the solid form, in any suitable mixing vessel in order to produce the amorphous intermediate condensed phosphate material.

In general, the order of addition and rate of addition may be varied depending upon, inter alia, the ease of handling and control of the reaction. It is preferred, however, that the rate of addition be such as to permit sufficient admixing for completion of the reaction. In this connection it should be noted that the preferred order of addition is the addition of a liquid condensed phosphoric acid to a solid granular alkali metal or alkaline earth metal material. Also, it is preferred that the rate of addition be slow; for example, drop wise or in a slow stream; with the condensed phosphoric acid being added to the preferred form of the alkali metal or alkaline earth metal material as it is undergoing a mixing action.

In general, the reaction can usually be conducted at room temperature, i.e., about 25° C. Although other temperatures may be used, it is preferable that the reaction be conducted at temperatures above about 0° C. and in no event it is necessary to use temperatures higher than the liquification temperature of the amorphous intermediate condensed phosphate material. In most cases, the reaction is exothermic with the temperature rising in some cases as high as 100° C. and more when the reaction is initiated at room temperature. However, when the reaction releases volatile gases, such as is usually the case when materials such as $NaCO_3$ with $CO_2$ being evolved are used, the temperature rarely goes above about 100° C. In general, the reaction product, i.e., the amorphous intermediate condensed phosphate material, usually produced by the reaction is a pulverulent solid material. In some cases, however, the intermediate phosphate may pass through a glue-like consistency during or subsequently following the reaction before it solidifies and it is, therefore, often advantageous to recycle either some of the amorphous intermediate phosphate material already solidified or the desired condensed phosphate formed in order to, among other things, reduce or minimize the glue-like consistency stage for ease in handling the mixture and carrying out the reaction. Although the reacting of a condensed phosphoric acid with an aqueous solution of an alkali metal or alkaline earth metal source is not preferred, because of the potential excess degradation of condensed phosphate anions and the need of removing the water of solution; nevertheless, with rapid drying and with an excess of recycled amorphous intermediate phosphate material, it is possible to reduce the amount of degradation sufficiently to form the desired intermediate material in the proper ratio of reactants. In view of the foregoing, it is, therefore, preferable to carry out the reaction under substantially anhydrous conditions. As used herein "substantially anhydrous conditions" means carrying out the reaction using substantially anhydrous alkali metal or alkaline earth metal sources, that is, those sources containing less than about 20% by weight of water of crystallization, and in the substantial absence of water except for that which may be produced during the reaction.

Although the intermediate condensed, phosphate material was determined by X-ray analysis to be substantially amorphous, it is not necessary that it be such since, in some cases, crystalline phosphate may be present in minor amounts, that is to say, usually less than about 50% by weight. It should be noted, however, that the foregoing is applicable to the intermediate condensed phosphate material which is formed by the reaction since, in some cases, recycle material may be used, as described above, which contains substantial amounts of, or is substantially crystalline material. The composition of the intermediate condensed phosphate material is believed to vary according to the amount of alkali metal or alkaline earth metal material reacted with the particular condensed phosphoric acid used, however, it is believed that a mixture of condensed phosphates make up this material. In general, the intermediate condensed phosphate material need only be calcined in order to produce crystalline condensed phosphates. In most cases, it is desirable to mill or grind the material prior to calcination in order to improve the calcination operation and the conversion rate of the intermediate condensed phosphate material to crystalline condensed phosphates. It should be noted that the amorphous intermeditae condensed phosphate material, a totally new form of condensed phosphate material, and in particular, the alkali metal amorphous intermediate condensed phosphate material, exhibits the ability to replace the crystalline condensed phosphates and the glassy condensed phosphates in such areas as water softening applications and detergent compositions in a truly surprising and remarkable manner.

The times and temperatures required to convert the various amorphous intermeditae phosphate materials described above to the desired crystalline condensed phosphate will depend upon, inter alia, the particular condensed phosphate to be produced, as well as upon the proportions and physical states i.e., degree of subdivision, uniformity of mixing, etc., of the reactants. In general, the temperatures utilized should be for best results somewhat above 260° C., but below the melting point of the desired crystalline condensed phosphate products. Generally speaking, the times necessary to produce the desired crystalline condensed phosphates are dependent on the temperatures used with higher calcination temperatures requiring less calcination times. It should be noted, however, that it may be advantageous at times to calcine the intermediate phosphate material short of substantially complete conversion to the desired crystalline condensed phosphates and, therefore, relatively low calcination temperatures may be used for relatively short calcination time periods.

When substantially complete conversion of the intermediate phosphate material to the alkali metal tripolyphosphate is desired, calcination temperatures of not over about 520° C. and calcination times of not over about 90 minutes are usually sufficient. It should be noted that pentasodium tripolyphosphate, $Na_5P_3O_{10}$, is known to be a polymorphic material of which at least two separate and distinct solid crystalline modifications have been identified. The modifications are commonly referred to as $Na_5P_3O_{10}$-I and $Na_5P_3O_{10}$-II. See Partridge et al., Journal of the American Society, vol. 63, page 454 et seq. $Na_5P_3O_{10}$-II is generally formed at temperatures below about 450° C. and preferably below about 400° C., whereas $Na_5P_3O_{10}$-I is generally formed at temperatures in excess of about 450° C. Therefore, the calcination temperatures used are governed by the pentasodium tripolyphosphate form which is desired.

When substantially complete conversion of the intermediate phosphate material to the alkali metal trimetaphosphate is desired, calcination temperatures of not over about 550° C. and calcination times of not over about 90 minutes are usually sufficient. It should be noted that, in general, temperatures of below about 400° C. produce insoluble sodium metaphosphate and temperatures in excess of about 450° C. produce soluble trisodium trimetaphosphates and, therefore, the calcination temperatures used are governed by the metaphosphate form which is desired.

When substantially complete conversion of the intermediate phosphate material to the alkali metal pyrophosphate is desired, calcination temperatures of not over about 800° C. and calcination times of not over about 90 minutes are usually sufficient.

When substantially complete conversion of the intermediate phosphate material to the alkaline earth metal metaphosphate is desired, calcination temperatures of not over about 700° C. and calcination times of not over about 120 minutes are usually sufficient.

When substantially complete conversion of the intermediate phosphate material to the alkaline earth metal pyrophosphate is desired, calcination temperatures of not over about 1000° C. and calcination times of not over about 90 minutes are usually sufficient.

All of the foregoing relating to times and temperatures required to convert the various amorphous intermediate phosphate materials described above to the desired crystalline condensed phosphate is, in general, applicable to preparing mixtures of the various crystalline condensed phosphates. It is generally preferable to use calcination temperatures which are usually sufficient for calcining the condensed phosphate member of the mixture requiring the lower calcination temperatures and to use calcination times which are usually sufficient for calcining the condensed phosphate member of the mixture requiring the longer calcination times. For example, when substantially complete conversion of the intermediate phosphate material to a mixture containing predominantly alkali metal tripolyphosphate and alkali metal pyrophosphate is desired, calcination temperatures of not over about 520° C. and calcination times not over about 90 minutes are usually sufficient.

To illustrate the invention the following examples are presented with parts by weight used unless otherwise indicated.

Example I

Into a reaction vessel equipped with a stirrer are charged about 191 parts of anhydrous sodium carbonate. The vessel is covered with a cover having a hole in it and about 170 parts of condensed phosphoric acid (75% $P_2O_5$ by weight) are dripped onto the sodium carbonate while the mixture is being stirred. The cover is used in order that any entrained sodium carbonate which might have condensed with water vapor is returned to the mixture, thereby attempting to maintain a proper ratio of alkali metal to acid in the reaction mixture. As can be determined from the amounts used the molar ratio of Na/P is about 2. The formed amorphous intermediate phosphate material foams and produces some heat from the reaction. The material upon cooling to room temperature solidifies. This material is milled and calcined at about 520° C. for about 1 hour. After calcining the yield is about 230 parts. Analysis by ion-exchange chromatography [Kolloff, R. H., A.S.T.M. Bull. 237, 74. (TP–94–TP–100) April 1959] gives the following approximate results based on the mole percent of the phosphorus:

Orthophosphate _____ 1.2
Pyrophosphate _____ 97.8
Tripolyphosphate _____ 1.0
Trimetaphosphate _____ 0.0

From the above it can be seen that tetrasodium pyrophosphate ($Na_4P_2O_7$) is formed almost exclusively.

Example II

In a reaction vessel and under similar conditions as described in Example I above, about 94 parts of 73% sodium hydroxide are used to react with about 147 parts of condensed phosphoric acid (83% $P_2O_5$ by weight) in the presence of about 300 parts of the already formed crystalline product. As can be determined from the amounts used the molar ratio of Na/P is about 2. The intermediate phosphate material formed is milled and calcined at about 520° C. for about 1 hour. After calcining the total yield is about 500 parts. Analysis by the same procedure used in Example I gives the following approximate results, based on the mole percent of phosphorus:

Orthophosphate _____ .7
Pyrophosphate _____ 98.2
Tripolyphosphate _____ 1.1
Trimetaphosphate _____ 0.0

From the above it can be seen that tetrasodium pyrophosphate ($Na_4P_2O_7$) is formed almost exclusively.

Example III

In a reaction vessel and under similar conditions as described in Example I, above, about 173 parts of potassium carbonate are used to react with about 142 parts of condensed phosphoric acid (75% $P_2O_5$ by weight). As can be determined from the amounts used in molar ratio of K/P is about 1.67. The intermediate phosphate material formed is milled and calcined at about 520° C. for about 1 hour. After calcining the yield is about 210 parts. Analysis by the same procedure as used in Example I gives the following approximate results, based on the mole precent of phosphorus:

Orthophosphate _____ .3
Pyrophosphate _____ 2.8
Tripolyphosphate _____ 96.3
Metaphosphate _____ .6

From the above it can be seen that pentapotassium tripolyphosphate ($K_5P_3O_{10}$) is formed almost exclusively.

Example IV

In a reaction vessel and under similar conditions as described in Example I above, about 132 parts of sodium carbonate are used to react with about 129 parts of condensed phosphoric acid (83% $P_2O_5$ by weight). As can be determined from the amounts used the molar ratio of Na/P is about 1.67. The intermediate phosphate material formed is milled and calcined at about 520° C. for about 1 hour. After calcining the yield is about 175 parts. Analysis by the same procedure as used in Example I gives the following approximate results, based on the mole percent of phosphorus:

Orthophosphate _____ .3
Pyrophosphate _____ 3.4
Tripolyphosphate _____ 95.0
Trimetaphosphate _____ 1.3

From the above it can be seen that pentasodium tripolyphosphate ($Na_5P_3O_{10}$) is formed almost exclusively.

Example V

In a reaction vessel and under similar conditions as described in Example I above, about 80 parts of sodium carbonate are used to react with about 129 parts of condensed phosphoric acid (83% $P_2O_5$ by weight). As can be determined from the amounts used the molar ratio of Na/P is about 1. The intermediate phosphate material formed is milled and calcined at about 520° C. for about 1 hour. After calcining the yield is about 145 parts. Analysis by the same procedure as used in Example I gives the following approximate results, based on the mole percent of phosphorus:

Orthophosphate _____ .3
Pyrophosphate _____ .3
Tripolyphosphate _____ 1.4
Trimetaphosphate _____ 98.0

From the above it can be seen that trisodium trimetaphosphate ($Na_3P_3O_9$) is formed almost exclusively.

*Example VI*

In a reaction vessel and under similar conditions as described in Example I above about 112 parts of calcium oxide are used to react with about 189 parts of condensed phosphoric acid (75% $P_2O_5$ by weight) as can be determined from the amounts used the molar ratio of Ca/P is about 1:1. The intermediate phosphate material formed is milled and calcined at about 700° C. for about 10 minutes. After calcining the yield is about 250 parts. Analysis by the paper chromatographic procedure (E. Karl-Kroupa, Analytical Chemistry 28, 1091, 1956, with enough sodium ethylenediamine tetraacetate for solubilizing calcium phosphate) shows that the product is essentially dicalcium pyrophosphate and contains less that 2% orthophosphate.

*Example VII*

About 316 parts of condensed phosphoric acid (75% $P_2O_5$ by weight) is reacted with a mixture of about 57 parts of anhydrous $K_2CO_3$ and about 133 parts of $Na_2CO_3$ in the same manner as described in Example I. The overall mole ratio of (Na+K)/P of the reaction product is about 1. The intermediate phosphate formed is milled and calcined at about 490° C. for about 45 minutes. After calcination, the yield is about 335 parts. The product is essentially a sodium-potassium trimetaphosphate which analyzes over 95% of the phosphate in the trimetaphosphate form by ion-exchange chromatography.

*Example VIII*

About 250 parts of condensed phosphoric acid (83% $P_2O_5$ by weight) are reacted with about 271 parts of anhydrous soda ash in the same manner as given in Example I. The overall mole ratio of Na/P of the intermediate phosphate formed is about 1.75. After calcination of the intermediate phosphate at about 480° C. for about 30 minutes, about 340 parts of product are obtained, which is analyzed to contain about 24% pyrophosphate and about 76% tripolyphosphate based on the mole percent of phosphorus by the ion-exchange chromatographic procedure.

In the foregoing example utilizing as one of the reactants an alkali metal source, other alkali metal materials, such as, $NaNO_3$, $KNO_3$, NaCl, KCl, $Na_3C_6H_5O_7$, $K_3C_6H_5O_7$, $Na_2C_2O_4$, $K_2C_2O_4$ and the like including mixtures thereof, may be used following substantially the same procedures and conditions as specified for $NaCO_3$, NaOH, $KCO_3$.

In the foregoing examples utilizing as one of the reactants an alkaline earth metal material other alkaline earth metal materials, such as $CaCl_2$, $Ca_3(C_6H_5O_7)_2$, $CaH_2$, $Ca(OH)_2$, $Ca(NO_3)_2$, $CaC_2O_4$, and the like including mixtures thereof, as well as, $MgCl_2$, $Mg(OH)_2$, $Mg(NO_3)_2$, $MgC_2O_4$, and the like including mixtures thereof, may be used following substantially the same procedures and conditions as specified for CaO.

From the foregoing, it can be appreciated, that the instant invention has been desrribed with a degree of particularity, and it is intended that the invention herein be limited only by the claims set forth hereinafter.

What is claimed is:

1. A process for the selective preparation of a crystalline condensed phosphate selected from the class consisting of alkali metal condensed phosphates of the class consisting of trimetaphosphates, tripolyphosphates, pyrophosphates, and mixtures thereof and alkaline earth metal condensed phosphates of the class consisting of metaphosphates and pyrophosphates, and mixtures thereof; comprising reacting together a condensed phosphoric acid and a material selected from the class consisting of alkali metal materials of the class consisting of alkali metal salts, oxides, hydroxides, and mixtures thereof and alkaline earth metal materials of the class consisting of alkaline earth metal salts, oxides, hydroxides, and mixtures thereof to form an amorphous intermediate condensed phosphate material, said reactants being used in a selected alkali metal to phosphorus atom ratio of about 1:1 to prepare said alkali metal trimetaphosphates, about 5:3 to prepare said alkali metal tripolyphosphates, and about 2:1 to prepare said alkali metal pyrophosphates and a selected alkaline earth metal to phosphorus atom ratio of about 1:2 to prepare said alkaline earth metal metaphosphates and about 1:1 to prepare said alkaline earth metal pyrophosphates, and calcining said intermediate material at a temperature from about 260° C. to below the liquification temperature of said crystalline condensed phosphate and for a time sufficient to produce said crystalline condensed phosphate.

2. The process of claim 1, wherein said reaction is conducted under substantially anhydrous conditions.

3. A process for preparing a selected crystalline alkali metal condensed phosphate material of the class consisting of trimetaphosphates, tripolyphosphates and pyrophosphates, comprising reacting together condensed phosphoric acid and an alkali metal material selected from the group consisting of alkali metal salts, oxides, hydroxides and mixtures thereof containing moieties which are capable of being removed as gases under the conditions specified herein, to form an amorphous intermediate condensed phosphate material, said reactants being used in a selected alkali metal to phosphorus atom ratio of about 1:1 to prepare said trimetaphosphate, about 5:3 to prepare said tripolyphosphate, and about 2:1 to prepare said pyrophosphate and calcining said intermediate material at a temperature above about 260° C. but below the liquification temperature of said crystalline condensed phosphate material for a time sufficient to produce said crystalline condensed phosphate material.

4. The process of claim 3, wherein said reaction is conducted under substantially anhydrous conditions.

5. A process for preparing a crystalline alkali metal trimetaphosphate comprising reacting together condensed phosphoric acid and an alkali metal material selected from the group consisting of alkali metal salts, oxides, hydroxides and mixtures thereof containing moieties which are capable of being removed as gases under the conditions specified herein to form an amorphous intermediate condensed phosphate material, said reactants being used in an alkali metal to phosphorus atom ratio of about 1:1, and calcining said intermediate material at a temperature above about 260° C. but below the liquification temperature of said crystalline trimetaphosphate for a time sufficient to produce said crystalline trimetaphosphates.

6. A process for preparing a crystalline alkali metal trimetaphosphate substantially free of impurities, comprising reacting together under substantially anhydrous conditions a condensed phosphoric acid containing from about 72% to about 85% $P_2O_5$ by weight and an alkali metal material selected from the group consisting of alkali metal salts, oxides, hydroxides and mixtures thereof containing moieties which are capable of being removed as gases under the conditions specified herein to form an amorphous intermediate condensed phosphate material, said reactants being used in an alkali metal to phosphorus atom ratio of about 1:1, and calcining said intermediate material at temperatures between about 260° C. and about 550° C., and for times not over about 90 minutes to produce sad crystalline trimetaphosphate.

7. The process of claim 6, wherein said crystalline alkali metal trimetaphosphate is trisodium trimetaphosphate and said alkali metal material is a sodium material selected from the group consisting of sodium hydroxide and sodium carbonate.

8. A process for preparing a crystalline alkali metal tripolyphosphate, comprising reacting together a condensed phosphoric acid and an alkali metal material selected from the group consisting of alkali metal salts, oxides, hydroxides and mixtures thereof containing moieties which are capable of being removed as gases under the conditions specified herein to form an amorphous intermediate condensed phosphate material, said reactants being used in an alkali metal to phosphorus atom ratio of about 5:3 and calcining said intermediate material at a temperature above about 260° C. but below the liquification temperature of said crystalline tripolyphosphate for a time sufficient to produce said crystalline tripolyphosphate.

9. A process for preparing a crystalline alkali metal tripolyphosphate substantially free of impurities, comprising reacting together under substantially anhydrous conditions a condensed phosphoric acid containing from about 72% to about 85% $P_2O_5$ by weight and an alkali metal material selected from the group consisting of alkali metal salts, oxides, hydroxides and mixtures thereof containing moieties which are capable of being removed as gases under the conditions specified herein to form an amorphous intermediate condensed phosphate material, said reactants being used in an alkali metal to phosphorus atom ratio of about 5:3 and calcining said intermediate material at temperatures between about 260° C. and about 520° C., and for times not over about 90 minutes to produce said crystalline tripolyphosphate.

10. The process of claim 9, wherein said alkali metal tripolyphosphate is pentasodium tripolyphosphate and said alkali metal material is a sodium material selected from the group consisting of sodium hydroxide and sodium carbonate.

11. The process of claim 9, wherein said alkali metal tripolyphosphate is pentapotassium tripolyphosphate and said alkali metal material is a potassium material selected from the group consisting of potassium hydroxide and potassium carbonate.

12. A process for preparing a crystalline alkali metal pyrophosphate, comprising reacting together a condensed phosphoric acid and an alkali metal material selected from the group consisting of alkali metal salts, oxides, hydroxides and mixtures thereof containing moieties which are capable of being removed as gases under the conditions specified herein to form an amorphous intermediate condensed phosphate material, said reactants being used in an alkali metal to phosphous atom ratio of about 2:1 and calcining said intermediate material at a temperature above about 260° C. but below the liquification temperature of said crystalline pyrophosphate for a time sufficient to produce said crystalline pyrophosphate.

13. A process for preparing a crystalline alkali metal pyrophosphate substantially free of impurities, comprising reacting together under substantially anhydrous conditions a condensed phosphoric acid containing from about 72% to about 85% $P_2O_5$ by weight and an alkali metal material selected from the group consisting of alkali metal salts, oxides, hydroxides and mixtures thereof containing moieties which are capable of being removed as gases under the conditions specified herein to form an amorphous intermediate condensed phosphate material, said reactants being used in an alkali metal to phosphorus atom ratio of about 2:1 and calcining said material at temperatures between about 260° C. and about 700° C., and for times of not over about 90 minutes to produce said crystalline pyrophosphate.

14. The process of claim 13, wherein said alkali metal pyrophosphate is tetrasodium pyrophosphate and said alkali metal material is a sodium material selected from the group consisting of sodium hydroxide and sodium carbonate.

15. The process of claim 13, wherein said alkali metal pyrophosphate is tetrapotassium pyrophosphate and said alkali metal material is a potassium material selected from the group consisting of potassium hydroxide and potassium carbonate.

References Cited
UNITED STATES PATENTS

| | | | |
|---|---|---|---|
| 2,419,147 | 4/1947 | King | 23—106 |
| 2,749,215 | 6/1956 | Callis | 23—107 |
| 2,920,939 | 1/1960 | Edwards | 23—106 |
| 2,962,354 | 11/1960 | Edwards | 23—106 |
| 2,988,439 | 6/1961 | Gloss | 23—106 X |
| 3,049,419 | 8/1962 | Raistrick et al. | 23—106 X |

OSCAR R. VERTIZ, *Primary Examiner.*

O. F. CRUTCHFIELD, *Assistant Examiner.*